United States Patent
Biswas et al.

(10) Patent No.: US 9,589,279 B2
(45) Date of Patent: Mar. 7, 2017

(54) GENERATING A DESCRIPTION OF USER INTERACTION WITH A BRAND BASED ON SOCIAL NETWORKING SYSTEM DATA FOR THE USER

(71) Applicant: Facebook, Inc., Menlo Park, CA (US)

(72) Inventors: Niket Biswas, Mountain View, CA (US); Giselle Schmitz, Redwood City, CA (US); Timothy Belonax, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/706,073

(22) Filed: Dec. 5, 2012

(65) Prior Publication Data

US 2014/0156417 A1   Jun. 5, 2014

(51) Int. Cl.
   *G06Q 50/00*   (2012.01)
   *G06Q 30/02*   (2012.01)

(52) U.S. Cl.
   CPC ......... *G06Q 30/0269* (2013.01); *G06Q 50/01* (2013.01)

(58) Field of Classification Search
   CPC . G06Q 30/0269; G06Q 30/0271; G06Q 50/01
   USPC ..................................................... 705/14.66
   See application file for complete search history.

(56) References Cited

U.S. PATENT DOCUMENTS

| | | | |
|---|---|---|---|
| 6,513,015 B2* | 1/2003 | Ogasawara | 705/26.1 |
| 2009/0276459 A1* | 11/2009 | Trout et al. | 707/104.1 |
| 2009/0315916 A1* | 12/2009 | Husemann et al. | 345/633 |
| 2011/0191417 A1* | 8/2011 | Rathod | 709/204 |
| 2012/0089451 A1* | 4/2012 | Agramonte et al. | 705/14.23 |
| 2012/0290370 A1* | 11/2012 | Montero et al. | 705/14.4 |
| 2012/0300087 A1* | 11/2012 | Shore et al. | 348/207.1 |
| 2013/0044959 A1* | 2/2013 | Mitchell et al. | 382/217 |
| 2013/0304828 A1* | 11/2013 | Robertson et al. | 709/206 |
| 2014/0058822 A1* | 2/2014 | Sobecks et al. | 705/14.37 |

* cited by examiner

*Primary Examiner* — David Stoltenberg
*Assistant Examiner* — Shawn Lillemo
(74) *Attorney, Agent, or Firm* — Fenwick & West LLP (57) ABSTRACT

A social networking system user interacts with a terminal associated with a brand, such as kiosk included in a retail location associated with the brand. The terminal provides authorization information to a user device that identifies the terminal and the brand associated with the terminal. Information identifying the user and the authorization information is communicated to the social networking system, which retrieves interactions between the user and objects associated with the brand in the social networking system. The retrieved interactions are communicated to the terminal, which generates content describing the user's interactions with the objects and presents the generated content to the user. A description of the user interaction and/or of the generated content may be communicated to the social networking system for distribution to additional users.

23 Claims, 3 Drawing Sheets

GENERATING A DESCRIPTION OF USER INTERACTION WITH A BRAND BASED ON SOCIAL NETWORKING SYSTEM DATA FOR THE USER

BACKGROUND

This invention relates generally to social networking systems and more particularly to generating a personalized representation of a social networking system user's interactions with a brand.

Entities such as businesses and vendors use a variety of channels to market their associated brands to potential customers. For example, a brand may provide information to potential customers through multimedia, commercials, print advertisements, interactive marketing methods, and visual presentations. Businesses target various products to different groups of people, such as persons in a certain age demographic or persons having a particular set of characteristics. However, conventional techniques limit businesses to marketing themselves to groups of users and do not allow businesses to provide a marketing experience personalized for an individual customer.

Social networking systems allow their users to share information and interests with each other. A social networking system gathers and stores the information about the users and their interests. The interests can be declared by users in user profiles or inferred from users' actions logged by the social networking system. In addition to maintaining information about individual users, a social networking system can include pages, or other data, associated with entities. Examples of entities include businesses, brands, products, communities, organizations, or other non-individual entities. This allows users to interact with entities via the social networking system. For example, users may view, like, or comment about a page or other object in the social networking system associated with a brand or products. While entities have had some success in marketing themselves to groups of customers based on interests or demographics, it is difficult for them to capture and use information about interests and actions of individual customers, such as data associated with a social networking system user.

SUMMARY

A social networking system stores interactions between its users and other objects or users maintained by the social networking system. Interactions between a user and objects associated with a particular brand, such as a manufacturer, a retailer or other entity, may be used to provide a user with a visual representation of the user's interactions with the brand. For example, interactions between a user and a brand are provided to a terminal associated with the brand, which generates a presentation describing the user's interactions with objects in the social networking system associated with the brand. This allows a brand to provide a more personalized interaction with a user to increase the likelihood of the user performing additional interactions with the brand. For example, a chronological listing of a user's interactions with objects associated with a brand may be presented to illustrate the user's engagement with the brand over time.

Data from the social networking system may be communicated to a terminal associated with a brand, and the terminal uses the data to generate content that is presented to a user. For example, a user interacts with the terminal, which provides authorization information to a social networking system identifying the terminal and a brand associated with the terminal. The authorization information may be communicated to a user device, which communicates the authorization information to the social networking system along with an identifier of the user. For example, the user device receives the authorization information via radio frequency communication, capturing a quick response code from the terminal, or other suitable communication method. Alternatively, the user may interact directly with the terminal, allowing the terminal to communicate user identification information to the social networking system.

The social networking system accesses a user profile associated with the user and a user profile associated with the brand to identify interactions between the user and objects in the social networking system associated with the brand. For example, the social networking system identifies a check-in at a location associated with the brand, a tag identifying the brand, an indication of preference for an object associated with the brand, a photograph associated with the brand, a status associated with the brand, or a comment about the brand. The retrieved interactions between the user and objects in the social networking system associated with the brand are communicated to the terminal, which generates content describing the user's interactions with the objects associated with the brand for presentation to the user. For example, the terminal generates a chronological listing of the user's interactions with objects associated with the brand. The generated content may also include information about the user retrieved from a user profile associated with the user, such as the user's interests, location, age, or other information.

In one embodiment, the terminal may receive the user interaction data when the user interacts with the terminal. Additionally, the terminal may communicate data about the user's interaction with the terminal to the social networking system. Based on this data, the social networking system generates a story describing the user's interaction with the terminal, and the generated story is distributed to other users connected to the user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows users to communicate and interact with other users. Users join the social networking system and add connections to other users. Each user has a user profile that is associated with user information. The user profile can include information about the user's age, gender, geographic location, education history, work history, and the like. Additionally, users may share information that may be interesting or relevant to other users, such as interests, news, links, comments, photos, or multimedia.

Users of a social networking system may include entities, such as businesses, manufacturers of goods, retailers, corporations, organizations, communities, groups, or other non-individuals. An entity may create and maintain a brand page on the social networking system. The brand page includes information associated with an entity, allowing users to obtain information about the entity via the brand page. Users can connect to the brand page to receive updates or information about the brand or products provided by the brand. Users can also express interest in a brand in the social networking system. For example, users can like, comment on, or post content about a brand or product on their user profiles or on the brand page.

A "brand" refers to a name, term, design, symbol, or any other feature that distinguishes an entity's goods or services from those of other entities. Hence, a brand is used to market or commercialize one or more products and is commonly associated with a company or business. For example, COCA-COLA® is a brand owned by the Coca-Cola Company and associated with various types of products provided by the Coca-Cola company (e.g., DIET COKE®, Cherry Coke). As used herein, "brand" may also refer to one or more products associated with the brand, and the company, business or entity associated with the brand. By being associated with a brand page and/or other objects maintained by the social networking system, the brand maintains a presence in a social networking system and is able to interact with other users of the social networking system.

Figure 1:
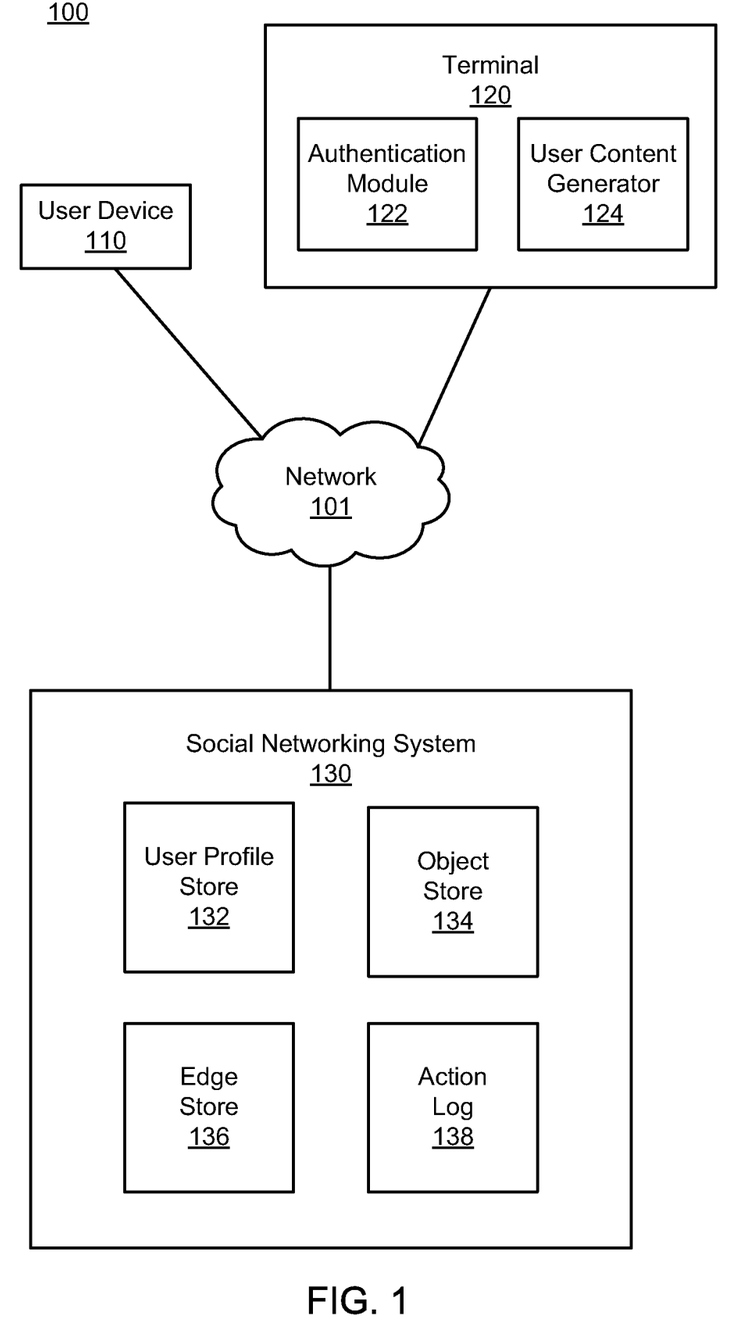
FIG. 1 is a high level block diagram illustrating a system environment, in accordance with an embodiment of the invention.

FIG. 1 is a high-level block diagram of a system environment 100 in which a social networking system 130 operates. The system environment 100 comprises a network 101, a user device 110, a terminal 120, and a social networking system 130. In alternative configurations, different and/or additional components may be included in the system environment 100. Additionally, the embodiments described herein may be adapted to online systems that are not social networking systems.

The network 101 is a communication pathway for one or more user devices 110, the terminal 120, and/or the social networking system 130. The network 101 may comprise any combination of local area and/or wide area networks using both wireless and/or wired communication systems. For example, the network 101 may include the Internet, as well as mobile telephone networks. In one embodiment, the network 101 uses standard communications technologies and/or protocols. Hence, the network 101 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 101 can use custom and/or dedicated data communications technologies instead of, or in addition to, the ones described above.

The user device 110 may be a desktop computer, laptop computer, portable computer, smart phone, personal digital assistant (PDAs) or any other device including computing functionality and data communication capabilities. The user device 110 is configured to communicate with the social networking system 130 or the terminal 120 via the network 101. In one embodiment, the user device 110 executes an application allowing the user of the user device 110 to interact with the social networking system 130 and/or the terminal 120. Alternatively, the user device 110 may comprise a chip or other suitable components configured to send and/or receive data using radio frequencies, near field communications (NFC), infrared, or any other suitable communication channel. For example, the user device 110 may be a radio frequency ID (RFID) chip or tag transmitting information that identifies the user of the user device 110 using radio-frequency electromagnetic fields. In other embodiments, a quick response (QR) code or bar code encoding information identifying the user of the user device 110 is affixed to or otherwise presented by the user device 110, allowing another device to retrieve the user identifying information from the QR code or bar code. In some embodiments, the RFID chip, near field communications (NFC) tag, bar code or quick response (QR) code may be associated with or coupled to a badge, a pin, a clip, a card or other hand-held or portable device.

The terminal 120 is a computing device that communicates with the user device 110 and with the social networking system 130. For example, the terminal is a kiosk included in a location associated with a brand, such as a retail location. A user may interact with the terminal 120, and the terminal 120 communicates information to the social networking system 130 and/or to the user device 110 based on the user's interaction. The terminal 120 is associated with a brand, allowing the terminal 120 to provide brand-specific content. Alternatively, the terminal may be associated with multiple brands, allowing it to provide content associated with one or more of the brands. Additionally, a terminal identifier may be used to uniquely identify the terminal 120.

In the embodiment shown by FIG. 1, the terminal 120 includes an authentication module 122 that authenticates the identity of a user interacting with the terminal 120. For example, a user interacts with the terminal 120, and requests the user to provide information for accessing the social networking system 130. If the user is authenticated, the social networking system 130 provides content associated with the user to the terminal 120, allowing the terminal 120 to generated and present content based on the information from the social networking system. For example, the terminal 120 generates content describing a user's prior interactions with objects in the social networking system 130 associated with the same brand as the terminal.

In one embodiment, when a user interacts with the terminal 120, the authentication module 122 sends authorization information to a user device 110 associated with the user. The authorization information identifies the terminal 120 and may also identify a brand associated with the terminal 120. The authorization information may be communicated to the user device 110 using any suitable communication method. Examples of communication methods for communicating the authorization information include: radio frequency ID (RFID), near field communications (NFC), scanning of a bar code or quick response (QR) code, displaying the authorization information to the user via a display, or any other suitable method.

In one embodiment, the user device 110 prompts the user to verify its identity to the social networking system 130 and to communicate the authorization information to the social networking system 130. For example, the user communicates identifying information and the authorization information to the social networking system 130 from the user device 110. Examples of identifying information include a user ID and/or password, a name, a username, an email, a numeric code, an access code, a phone number, a home address, or other suitable information. In some embodiments, the user may be identified by providing a correct answer to a security question (e.g., CAPTCHA). In other embodiments, the user's identity may be retrieved from information stored on the user device 110 (e.g., stored login information) and communicated to the social networking system 130 with the identification of the terminal 120 and/or the brand associated with the terminal 120. The identifying information can be submitted via a mobile application on a smart phone or a log-in screen on a webpage. In other embodiments, an authentication prompt is provided to the user via the user device 110 to submit the user's identifying information (e.g., user identifier, password). Alternatively, the user provides identifying information to the terminal 120, and the authentication module 122 communicates the identifying information, terminal identifier and brand associated with the terminal to the social networking system 130 via the network 101.

Using the identifying information, the social networking system 130 verifies that data associated with the user is stored. If no information is associated with the user, the social networking system 130 may notify the authentication module 122 and/or the user device 110. If the identifying information cannot be verified, the user may be prompted, by the authentication module 122 or by the user device 110, to re-enter or submit other identifying information. If the social networking system 130 includes data associated with the user, the social networking system 110 retrieves stored interactions between the user and the brand associated with the terminal 120. This allows the social networking system 130 to provide information describing how the user has previously interacted with the brand. Additionally, the social networking system 130 may provide information describing the user to the terminal 120. Data about the user can include information about the user's age, gender, occupation, geographic location, interests, education, and the like. Data about the user's interactions with the brand can include the user's past check-ins at business locations, comments or posts about the brand, or photos posted by the user about the brand.

Based on the information received from the social networking system 130, the user content generator 124 generates content from the received information. The user content generator 124 may display the user's interactions with the objects within the social networking system 130 associated with the brand in a chronological order. Alternatively, the user content generator 124 may provide any suitable representation of the user's interactions with objects associated with the brand by the social networking system 130. The content generated by the user content generator 124 may provide a personalized chronological and individualized visual presentation of the user's interactions with the brand via the social networking system 130. The generated content may be presented via the terminal 120 or may be communicated from the terminal 120 to the user device 110 for presentation. The user may interact with the generated content to obtain additional information about portions of the generated content. Further details about the user content generator 124 are provided below in conjunction with FIG. 2.

In the example of FIG. 1, the social networking system 130 includes a user profile store 132, an object store 134, an edge store 136, and an action log 138. However, in other embodiments, the social networking system 130 may include different and/or additional components than those shown by FIG. 1.

Each user of the social networking system 130 has a user profile, which is stored in the user profile store 132. A user profile includes information about the user that is explicitly provided by the user and can include profile information inferred by the social networking system 130. In one embodiment, a user profile includes multiple data fields, each data field describing one or more attributes of the user. The user profile information stored in the user profile store 132 may include biographic, demographic, and other types of descriptive information about the user, such as age, gender, location, hobbies, preferences, interests, work experience, educational history, and the like. The user profile is also associated with a username, password, ID number, one or more verified IP addresses, or other identifying information, such as an email address, date of birth, location information, or user-specific questions and answers for identifying a user associated with the user profile. The user profile store 132 can also store content items associated with the user profile, such as images, photos, text, and multimedia content, such as videos or audio files. A user profile in the user profile store 132 may also maintain references to actions by the corresponding user performed on content items and stored in the action log 138. The user profile store 132 stores data about posts, comments, status updates, images, links, multimedia, video, or other content that is displayed on the user profile.

The user profile store 132 stores user profiles for entities other than individual users, such as businesses, companies, corporations, communities, or organizations. This allows an entity to establish a presence on the social networking system 130 for connecting and exchanging content with other social networking system users. An entity may be associated with a user profile that includes information about the entity, such as geographic location(s), product information, brand information, advertisements, deals, etc. Information from an entity's user profile may be used to generate a brand page, stored in the object store 134, describing the entity and/or products or services provided by the entity.

The object store 134 stores data about objects of the social networking system 130. Examples of objects include photographs, images, links, pages, comments, or any suitable content embodying concepts and entities. Users may interact with an object in the social networking system 130 in a variety of ways. Examples of interactions with an object include: expressing a preference for the object (i.e., "liking" the object), commenting on the object, tagging the object, posting content associated with the object, or any other suitable interaction. The object store 134 may also include information associating an object with an entity or user. For example, data included in an object identifies a brand associated with the object.

The edge store 136 stores data about edges, which are connections between users and/or between users and objects (e.g., pages) in the social networking system 130. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 130, such as expressing interest in a page on the social networking system, sharing a link with other users of the social networking system, and commenting on posts made by other users of the social networking system.

The edge store 136 may also store affinity scores for objects, interests, pages, and other users. Affinity scores can be computed by the social networking system 130 over time to approximate a user's affinity for an object, interest, and other users based on the actions performed by the user. A user's affinity may be computed by the social networking system 130 over time to approximate a user's affinity for an object, interest, and other users in the social networking system 130 based on the actions performed by the user. Computation of affinity is further described in U.S. patent application Ser. No. 12/978,265, filed on Dec. 23, 2010, which is hereby incorporated by reference in its entirety. For example, if a user likes a page about Cyclocross bikes and posts frequently about biking, the social networking system 130 can determine that the user has a high affinity for bikes or biking and can calculate an affinity score accordingly. The affinity score can be stored in the edge store 136 in association with the edge and/or the user.

The action log 138 stores information about the actions by users in the social networking system 130 as well as actions by users on websites external to the social networking system. Such actions can include liking or commenting on a post, uploading an image or link, sending or reading a message, clicking on a link or image, viewing content associated with another user, adding content to another user's page, among others. The action log 138 stores actions between a user and a user profile of an entity (e.g., a brand page) within the social networking system 130, or between a user and an object on a user profile. Each user's interaction with an object associated with a brand in the social networking system 130 can be associated with the user performing the interaction as well as the brand and stored. In some embodiments, data from the action log 138 is used to infer interests or preferences of the user, augmenting the interests included in the user profile and allowing a more complete understanding of user preferences The action log 138 may also store user actions taken on external websites. For example, an e-commerce website that primarily sells sporting equipment at bargain prices may recognize a user of a social networking system 130 through social plug-ins that enable the e-commerce website to identify the user of the social networking system 130. Because users of the social networking system 130 are uniquely identifiable, e-commerce websites, such as this sporting equipment retailer, may use the information about these users as they visit their websites. The action log 138 records data about these users, including webpage viewing histories, advertisements that were engaged, purchases made, and other patterns from shopping and buying.

Hence, user profile store 132, the object store 134, the edge store 136, and the action log 138 allow the social networking system 130 to generate a social graph comprising nodes connected by edges. Nodes include users and objects of the social networking system 130, such as web pages embodying concepts and entities, and the edges connect the nodes. Edges represent a particular interaction between two nodes, such as when a user expresses an interest in a brand or product. Some edges between users can be defined by real-life relationships. For example, users may generate edges with other users that are labeled as friends, colleagues, acquaintances, close friends, partners, boyfriend and girlfriend, husband and wife, and so forth. Other edges are generated when users interact with objects in the social networking system 130, such as when a user likes a profile page of a brand or company. Additionally, custom objects may be defined for inclusion in the social graph to more easily allow interactions to be captured via external websites.

Generating User Content from Interactions with a Brand

Figure 2:
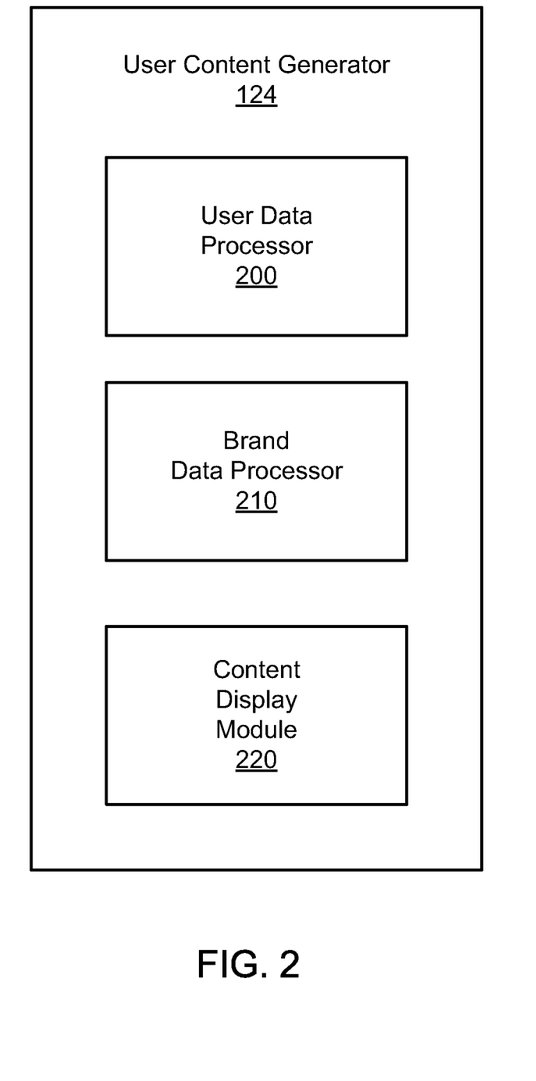
FIG. 2 is a high level block diagram illustrating a user content generator, in accordance with an embodiment of the invention.

FIG. 2 is a high-level diagram of one embodiment of the user content generator 124. In the embodiment shown by FIG. 2, the user content generator 124 includes a user data processor 200, a brand data processor 210, and a display module 220. However, in other embodiments, the user content generator 124 includes different and/or additional components than those shown by FIG. 2.

The user data processor 200 identifies and processes information about the user received from the social networking system 130. Examples of data about the user include the user's name, age, gender, occupation, location, education, and the like. Additional examples of data about the user include the user's interests, for example, products, music, movies, celebrities, or sports. The data about the user can be aggregated in a document or data package by the social networking system 130 and sent to the user data processor 200. Alternatively, data about the user may be combined with data describing the user's interactions with objects associated with a brand, and the user data processor 200 extracts the information about the user.

The user data processor 200 generates content from the information about the user. In some embodiments, the user data processor 200 includes information about the user for inclusion on a chronological listing of the user's interactions with objects associated with the brand associated with the terminal. In one example, a user's name and/or photos are identified for display. The user's information could also be used to select the type of content describing user interactions with objects associated with the brand to generate. For example, based on an age associated with the user, the user data processor 200 determines that the user is a minor and selects a format or template for content that is suitable for children. In another example, the user data processor 200 determines that the viewing user is a woman and selects format for the content describing interaction with objects associated with the brand that is tailored towards female viewers. For instance, a content template for the NIKE® brand can include feminine colors or graphics, while an alternate template is formatted to appeal to male viewers. In another embodiment, the user data processor 200 analyzes user's interests to identify a type associated with the user or to identify products or services associated with the brand that the user would be likely to have an interest in viewing or purchasing; these identified products or services are then included in the generated content describing the user's interactions with objects associated with the brand.

The user data processor 200 may select a portion or all of the information about the user and communicate the selected information to the brand data processor 210 for generating the content describing user interactions with objects associated with the brand. In some embodiments, the user data processor 200 selects a subset of the data about the user for generating the content. For example, the user's name, geographic location, age, or photos of the user are selected.

The brand data processor 210 receives data about the user and the user's interactions with objects associated with the brand from the user data processor 200. Each of interactions between the user and an object associated with the brand by the social networking system 130 is associated with chronological data (e.g., a date and/or time) corresponding to when the interaction occurred. For example, a user Bob likes a NIKE® brand page on Aug. 10, 2012. On Aug. 30, 2012, Bob posts a photo of a friend who is wearing NIKE® shoes and tags the shoes as a NIKE® product. On Sep. 3, 2012, Bob comments on the NIKE® brand page about how much he likes his new NIKE® shoes ("My new Nike shoes are awesome!"). The brand data processor 210 may use the chronological data to organize the interactions in a chronological order. If multiple interactions occur on the same day, they can be ordered chronologically based on the time of the interaction. For example, the brand data processor 210 organizes interactions from least recent to most recent, allowing the user to view a timeline of its interactions with objects associated with the brand.

The data describing the user's interactions with objects associated with the brand may include any type of action or connection between the user and an object associated with the brand. For example, the user's check-ins at locations associated with the brand are identified. Additional examples of identified interactions include: comments or posts about the brand or related products, photographs associated with the brand or product, photographs tagged with the brand. In one embodiment, the brand data processor 210 may select a subset of the interactions between the user and objects associated with the brand. For example, the interactions occurring within a specified time period (e.g., past five years) or the interactions having a specified type (e.g., check-in, photograph, comment, etc.) are selected to generate the content describing user interactions with objects associated with the brand. As another example, the user's interactions with the most views by other users, indication of preferences by other users, comments by other users, shares with other users, or other suitable criteria are selected by the brand data processor 210.

The brand data processor 210 associates interactions received from the social networking system 130 with portions of the content describing user interactions with objects associated with the brand. For example, the brand data processor 210 identifies a point on a timeline for various interactions based on timing data associated with an interaction. For example, the content describing user interactions associates Bob's interaction of liking a NIKE® brand page with the date of Aug. 10, 2012, and uses this date to determine where this interaction is presented relative to other interactions. Similarly, Bob's posting of a photo with NIKE® shoes is assigned the date of Aug. 30, 2012, which is used to position the photo interaction in the generated content relative to the liking interaction.

In some embodiments, the user interactions with the objects associated with the brand are categorized by type of interaction or similarity of content. For example, a user's check-ins to locations associated with the brand are categorized together. In another example, a user's likes of various products associated with the brand can be categorized as a type of user interaction. In one embodiment, a user may select a type of interaction, and the generated content is modified to display interactions having the selected type. In some embodiments, the user's likes of objects associated with the brand may be selected and presented via the generated content. The brand data processor 210 may select a specific type of user interaction (likes, check-ins, photos, etc.) and generate content presenting only the selected type of user interaction.

The brand data processor 210 generates content for display via the terminal 120 from the user information and the information describing user interaction with objects associated with the brand. For example, the brand data processor 210 generates the content using a graphic template including information and visual representations of the brand. The template may be personalized with the user's information and/or interactions with the brand, such as photos, check-in locations, or selected images of products. For example, a user Michelle providing an interaction with the terminal that requests content describing interactions with NIKE® causes content identifying the user "Michelle" and the brand "NIKE®." In one embodiment, the brand data processor 210 chronologically orders the user interactions with objects associated with the brand. The interactions may also be associated with text, photo, link or image that describes or represents the user interactions.

The content display module 220 receives the generated content from the brand data processor 210 and generates the display of the generated content. For example, the generated content may be organized and displayed based on time data, such as day, month, year, or decades. Each data point representing an interaction may be displayed at a location based on its associated time data and may be associated with text describing the user's interaction with an object. In some embodiments, some data points are visually distinguished from other data points on the generated content; other data points may be hidden from view or grouped together, but may be presented based on user interaction with the displayed content.

In some embodiments, the content presented to the user is interactive and allows the user to modify the presented content by interacting with the displayed content. For example, the user may select various data points from the displayed content, causing display of additional data about the selected data points. This allows the user to receive further details about interactions corresponding to the selected data points. In one embodiment, the user may select a time range to view interactions with objects associated with the brand within the selected time range (e.g., user interactions occurring in particular month or year) or may select types of user interactions with the brand (e.g., check-ins or photos). For example, a user Bob accesses an icon, text, image or other data on the displayed content indicating the year 2012, causing interactions between Bob and content associated with a brand (e.g., comments, photos, check-ins, likes, links, etc.) occurring in 2012 to be displayed. In other embodiments, an icon or link representing a type of user's interaction with the brand may be selected so that interactions associated with the selected type, or details about interactions associated with the selected type are displayed.

In one embodiment, the generated content is graphically presented to the user as virtual hallway, where the user can "walk" through the hallway to view interactions with the brand at different points along the hallway. The user may also select certain type periods or interactions from the virtual hallway to see additional details about interactions within a time period, or about various interactions. In one embodiment, the user begins at the earliest interaction with the brand and "walks" through the timeline hallway chronologically to the most recent interaction.

In other embodiments, the generated content is presented as a video presentation including series of photos of the user, photos of the brand or product, or other graphics or visual representations of the user's interactions with the brand. The content may be generated from a video template associated with the brand associated with the terminal 120. The video template may be personalized with the user's information or interactions with the brand, such as photos, check-in locations, or selected images of products. The template may also incorporate the user's personal information, such as the user's name, age, or gender. In some embodiments, the video presentation further includes music or sounds that are associated with the brand. The video presentation may include a voice-over or other narration describing one or more of the brand, the user's interactions with the objects associated with the brand, the time period shown by the video presentation, or other suitable data. In another embodiment, the video presentation is shown in a story format, where the user is a main character, chronologically following the user's interactions with the brand.

After generating the content, the display module 220 communicates the generated content to a display associated with the terminal 120 or to a user device 110 for presentation. In some embodiments, the display module 220 sends the generated content to the social networking system 130, allowing the social networking system 130 to generate a story describing the generated content. The story may be communicated to other users connected to the user via the social networking system 130; for example, the story describing the generated content is included in a news feed presented to other users connected to the user. The display module 220 may also communicate user interactions with the terminal 120 to the social networking system 130, allowing stories to be generated and distributed describing interaction with the terminal 120. Additionally, the social networking system 130 may store the generated content in the user profile store 132 and/or the object story 134 and associated with the user. In one embodiment, the generated content may be viewed via the social networking system 130 (e.g., on the user's profile page or on a news feed page).

Figure 3:
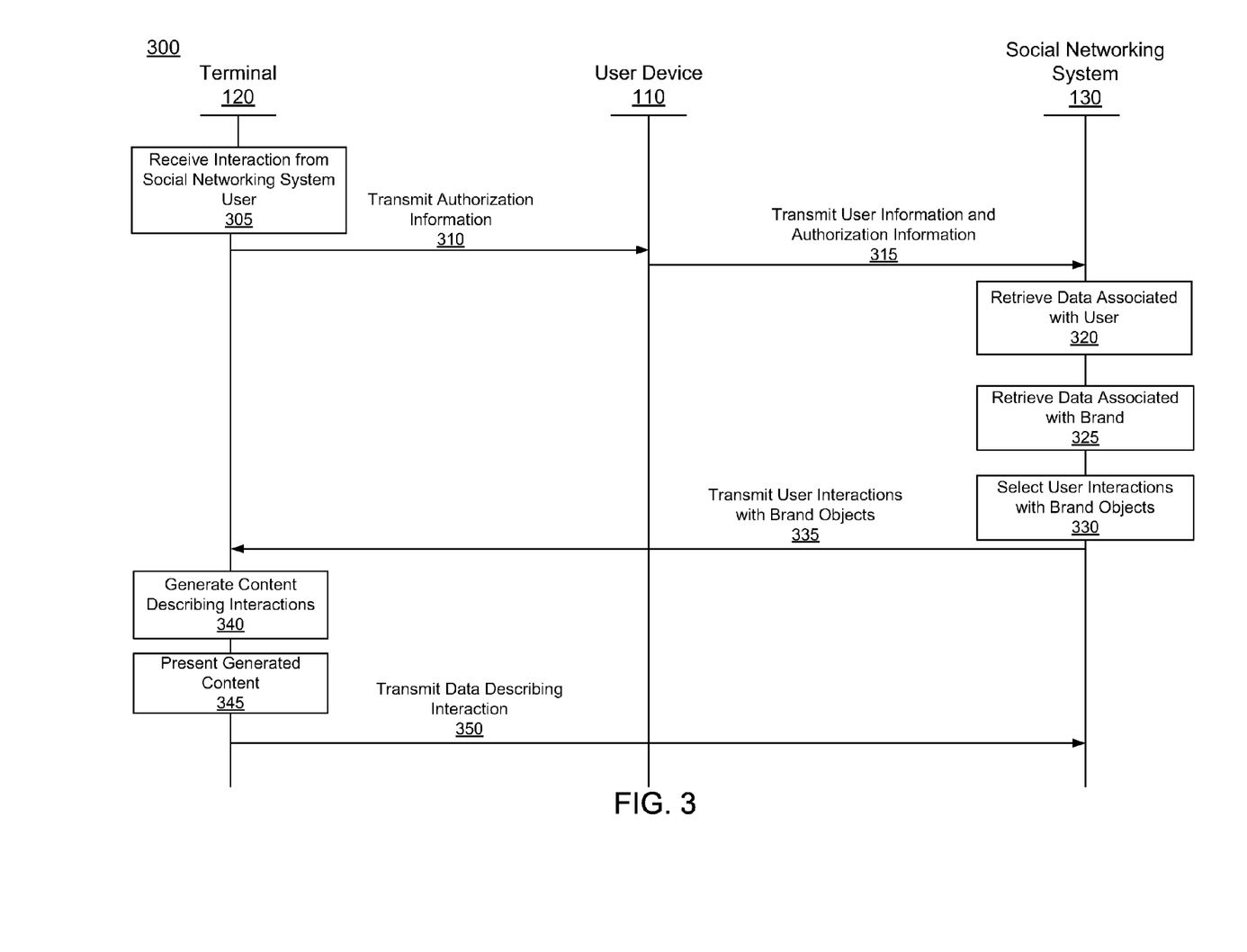
FIG. 3 is an interaction diagram illustrating a method for generating content describing user interaction with a brand via a social networking system, in accordance with an embodiment of the invention.

FIG. 3 is an interaction diagram of an embodiment of a method 300 for generating content describing a user's interactions with objects in a social networking system 100 associated with a brand. A terminal 120 associated with a brand receives 305 an interaction from a user. For example, the user requests content describing the user's interaction with the brand from the terminal 120, or requests information about products associated with the brand from the terminal 120. As described above in conjunction with FIG. 1, the terminal 120 may be a kiosk in a retail location, or other location, associated with the brand.

The terminal transmits 310 authorization information to a user device 110 associated with the user after receiving 305 the interaction from the user. The authorization information identifies the terminal 120 and a brand associated with the terminal 120. The authorization information may be transmitted 310 to the user device 110 using any suitable communication method. Examples of communication methods for communicating the authorization information include: radio frequency ID (RFID), near field communications (NFC), scanning of a bar code or quick response (QR) code, displaying the authorization information to the user via a display, or any other suitable method.

The user device 110 transmits 315 the authorization information and user identifying information to the social networking system 130 via a network 101. Alternatively, the user provides user identifying information to the terminal 120, and the terminal 120 transmits the authorization information and the user identifying information to the social networking system 130. Using the user identifying information, the social networking system 130 retrieves 320 data associated with the user and stored by the social networking system 130. For example, the social networking system 130 retrieves 320 a user profile associated with the user. Additionally, the social networking system 130 retrieves 325 data associated with the brand, such as a user profile associated with the brand and/or objects associated with the brand by the social networking system 130.

Based on the data associated with the brand and the data associated with the user, the social networking system 130 selects 330 interactions between the user and objects associated with the brand. The social networking system 130 may select 330 all interactions between the user and objects associated with the brand, or may select 330 a subset of the interactions between the user and the objects associated with the brand based on one or more criteria. For example, interactions with a specified type of objects, a specified type of interaction, interactions occurring within a specified time range, interactions with objects for which the user has at least a threshold affinity, or any other suitable group of interactions are selected 330. In one embodiment, the authorization information may include criteria for selecting 330 the interactions between the user and the objects associated with the brand The social networking system 130 transmits 335 the selected interactions between the user and the objects associated with the brand to the terminal 120 via the network 101. Using the received interactions, the terminal 120 generates 340 content describing the user's interactions with the brand as described above in conjunction with FIG. 2. The generated content is presented 345 to the user via the terminal 120 or via the user device 110, allowing the user to review prior interactions with the brand via the social networking system 130. As described above in conjunction with FIG. 2, the generated content may have any suitable format, and user interaction with the generated content may modify the content presented 345 to the user.

In one embodiment, the terminal 120 transmits 350 a description of the received user interaction with the terminal 120 to the social networking system 130, allowing the social networking system 130 to notify additional users connected to the user of the interaction. For example, the social networking system 130 generates a story describing the user interaction with the terminal 130 and presents the story in news feeds of other users connected to the user. Additionally, the terminal 120 may transmit 350 the generated content to the social networking system 130 via the network, allowing the generated content to be accessed via the social networking system and/or to be distributed to other users connected to the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at a terminal associated with a brand, an interaction from a user of a social networking system requesting the terminal to provide information associated with the user combined with information describing the brand to the user;
   communicating, by the terminal associated with the brand, authorization information to a user device associated with the user, the authorization information identifying the terminal and a brand associated with the terminal;
   receiving, by the social networking system, the authorization information identifying the terminal from the user device associated with the user;
   responsive to receiving the authorization information, selecting, by the social networking system, interactions that occurred over a time range, the interactions between the user and one or more objects represented in the social networking system, the one or more objects associated with the brand;
   sending, by the social networking system, information describing the interactions to the terminal;
   receiving, at the terminal associated with the brand, the information describing the interactions;
   generating a chronological display of a plurality of content items using the information from the time range, each content item including information corresponding to the user and information corresponding to the interactions between the user and the one or more objects associated with the brand; and
   presenting the generated chronological display of the plurality of content items to the user via a display at the terminal associated with the brand.

2. The method of claim 1, further comprising:
   communicating, by the social networking system, the generated chronological display of the plurality of content items to the social networking system for distribution to the other users connected to the user.

3. The method of claim 1, wherein the visual representation corresponding to the brand includes at least one of: an image associated with a check-in at a location associated with the brand, a tag identifying the brand, an indication of preference for an object associated with the brand, a photograph associated with the brand, a status associated with the brand, and a comment about the brand.

4. A method comprising:
   receiving, at a social networking system from a user device associated with a user of the social networking system, an authorization request from the user, the authorization request generated by the user device in response to an interaction of the user with a terminal associated with a brand, the interaction comprising a request from the user for information associated with the user combined with information describing the brand, the authorization request including authentication information identifying the terminal and the brand associated with the terminal, wherein the user device receives the authentication information identifying the terminal and the brand associated with the terminal from the terminal;
   responsive to receiving the authorization request from the user device, retrieving, by the social networking system, information associated with the user from a user profile of the user maintained by the social networking system;
   responsive to receiving the authorization request from the user device, retrieving, by the social networking system, information associated with the brand from a profile of the brand maintained by the social networking system;
   selecting, by the social networking system, interactions that occurred over a time range between the user and objects associated with the brand based on the retrieved information associated with the user and the retrieved information associated with the brand; sending, by the social networking system to the terminal, a set of the retrieved information corresponding to the selected interactions that includes (1) at least one of a date and time corresponding to when the interaction occurred, (2) a visual representation corresponding to the brand, and (3) information corresponding to the user and information corresponding to the interactions between the user and one or more objects represented in the social networking system, the one or more objects associated with the brand; and
   receiving, at the terminal associated with the brand, the set of retrieved information corresponding to the selected interactions; and
   displaying, on the terminal, the set of retrieved information corresponding to the selected interactions in a chronological display.

5. The method of claim 4, wherein the terminal is a kiosk at a location associated with the brand.

6. The method of claim 4, further comprising:
receiving, by the social networking system, a description of an interaction between the user and the terminal;
generating by the social networking system, a story based on the received description; and
presenting by the social networking system, the generated chronological display to additional users connected to the user.

7. The method of claim 4, wherein the visual representation corresponding to the brand comprises one or more of: an image associated with a check-in at a location associated with the brand, a tag identifying the brand, an indication of preference for an object associated with the brand, a photograph associated with the brand, a status associated with the brand, a comment about the brand, and any combination thereof.

8. The method of claim 4, wherein selecting interactions between the other users connected to the user and objects associated with the brand is further based in part on a type associated with each of the interactions between the user and the objects associated with the brand.

9. A non-transitory computer-readable storage medium having instructions that, when executed by a processor, cause the processor to perform actions comprising:
receiving, at a terminal associated with a brand, an interaction from a user of a social networking system requesting the terminal to provide information associated with the user combined with information describing the brand to the user;
communicating, by the terminal, authorization information to a user device associated with the user, the authorization information identifying the terminal and a brand associated with the terminal, the authorization information to be provided by the user device to the social networking system for authorizing the terminal to provide the requested information to the user;
responsive to the terminal being authorized by the social networking system, receiving, by the terminal from the social networking system, information describing interactions that occurred over a time range, the interactions between the user and one or more objects associated with the brand;
generating a chronological display of a plurality of content items using the information from the time range, each content item including:
a visual representation corresponding to the brand; and
information corresponding to the user and information corresponding to the interactions between the user and the one or more objects associated with the brand; and
presenting the generated chronological display of the plurality of content items to the user via a display associated with the terminal.

10. The non-transitory computer-readable storage medium of claim 9, wherein the instructions cause the processor to perform actions further comprising:
communicating the generated content to the social networking system for distribution to other users connected to the user.

11. The non-transitory computer-readable storage medium of claim 9, wherein presenting the generated chronological display to the user comprises:
presenting interactions between other users connected to the user and one or more objects in the social networking system associated with the brand in a chronological order.

12. The non-transitory computer-readable storage medium of claim 9, wherein the interactions between the user and one or more objects in the social networking system associated with the brand are selected from a group consisting of: a check-in at a location associated with the brand, a tag identifying the brand, an indication of preference for an object associated with the brand, a photograph associated with the brand, a status associated with the brand, a comment about the brand, and any combination thereof.

13. The non-transitory computer-readable storage medium of claim 9, wherein presenting the generated chronological display to the user comprises:
presenting a group of interactions between other users connected to the user and one or more objects in the social networking system associated with the brand that have a specified type.

14. The method of claim 1, wherein receiving, at the terminal, an interaction from a user of a social networking system comprises receiving a request from the user device associated with the user.

15. The method of claim 14, wherein the user device comprises a radio-frequency identification (RFID) chip encoded with information identifying the user associated with the user device.

16. The method of claim 1, wherein presenting the generated chronological display further comprises displaying the generated chronological display of content items as a virtual hallway configured for viewing the interactions between the other users connected to the user and the brand at different points in the virtual hallway.

17. A system comprising:
a terminal associated with a brand configured for:
receiving an interaction from a user of a social networking system requesting the terminal to provide information associated with the user combined with information describing the brand to the user;
communicating authorization information from an authentication module of the terminal to a user device associated with the user, the authorization information identifying the terminal and a brand associated with the terminal, the authorization information to be provided by the user device to the social networking system for authorizing the terminal to provide the requested information to the user;
responsive to the terminal being authorized by the social networking system, receiving information describing interactions that occurred over a time range from the social networking system, the interactions between the user and one or more objects represented in the social networking system, the one or more objects associated with the brand;
generating a chronological display of a plurality of content items using the information from the time range, each content item associated with a first photo corresponding to the user and a second photo corresponding to the interactions between the user and the one or more objects represented in the social networking system, the one or more objects associated with the brand; and
presenting the generated chronological display of the plurality of content items to the user via a display at the terminal associated with the brand.

18. The method of claim 1, wherein selecting interactions that occurred over a time range comprises selecting a subset of interactions between the user and objects associated with the brand, the selected subset identifying interactions with a specified type of objects.

19. The method of claim 1, wherein selecting interactions that occurred over a time range comprises selecting a subset of interactions between the user and objects associated with the brand, the selected subset identifying a specified type of interaction.

20. The method of claim 1, wherein selecting interactions that occurred over a time range comprises selecting a subset of interactions between the user and objects associated with the brand, the selected subset identifying interactions with objects for which the user has at least a threshold affinity.

21. The method of claim 1, further comprising:
  categorizing the interactions between the user and the one or more objects associated with the brand by a type of interaction.

22. The method of claim 1, further comprising:
  categorizing the interactions between the user and the one or more objects associated with the brand based on a similarity of content.

23. The method of claim 1, wherein the chronological display is generated using a graphic template including information and visual representations of the brand, the template personalized with information describing the user and interactions with objects associated with the brand.

* * * * *